Nov. 24, 1936.   C. R. ROBERTS   2,061,849
SHOE FITTING DEVICE
Filed Aug. 30, 1935
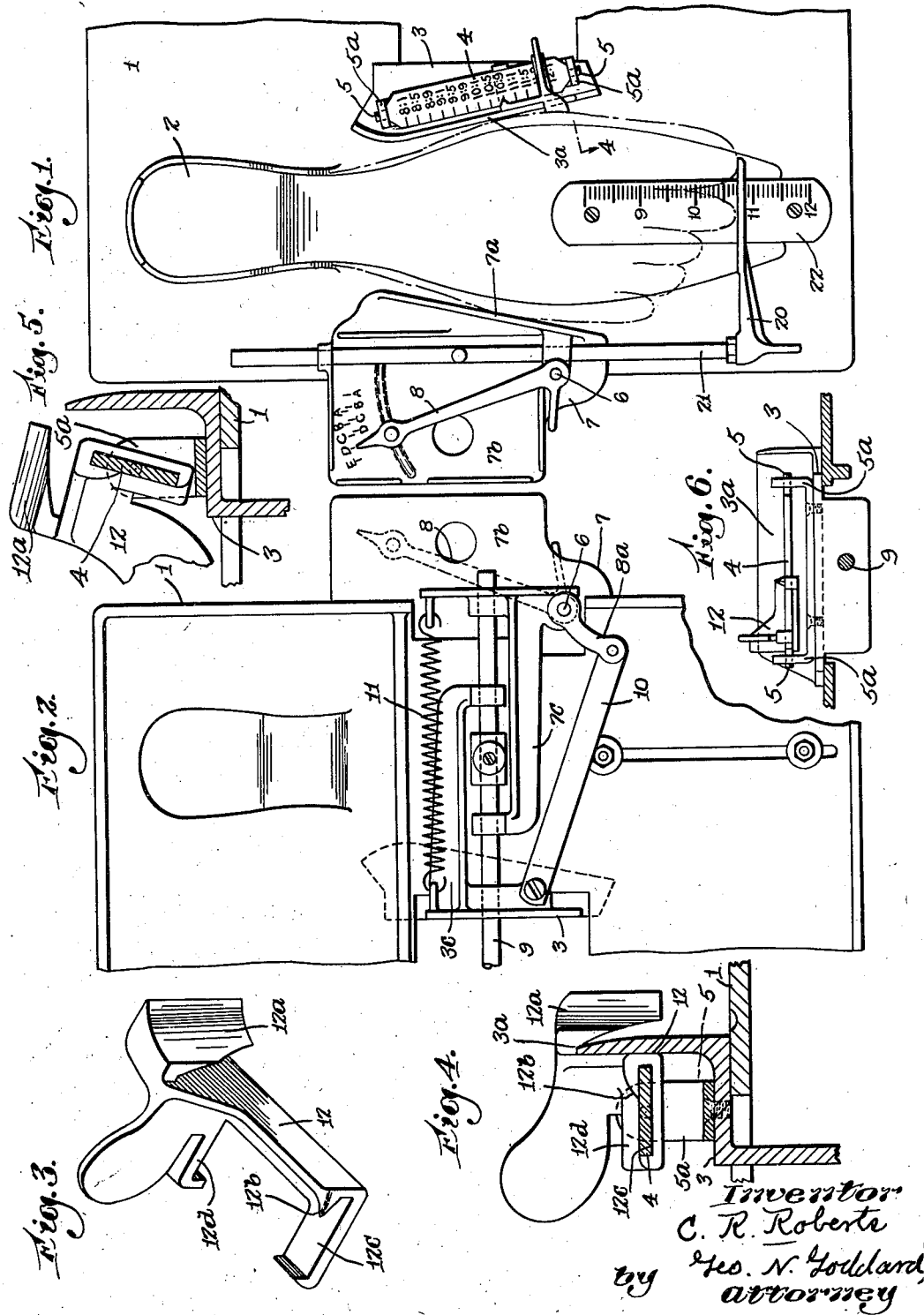
Inventor
C. R. Roberts
by Geo. N. Goddard
attorney Patented Nov. 24, 1936

2,061,849

UNITED STATES PATENT OFFICE 2,061,849

SHOE FITTING DEVICE

Charles R. Roberts, New York, N. Y., assignor to Regal Shoe Company, Whitman, Mass., a corporation of Massachusetts Application August 30, 1935, Serial No. 38,570

4 Claims. (Cl. 33—3)

This invention relates to foot measuring machines of the type shown in United States Letters Patent No. 1,971,954, which embraces opposed divergent side gauge members capable of independent movement to indicate the ball width measurement and also provided with adjustable toe gauging means for indicating the over-all length of the foot.

To this type of machine has been added a ball length measuring device such as shown in United States patent to Clarke No. 1,962,101 and the object of the present invention is to effect certain improvements in the construction and arrangement of said Carke patent to eliminate certain objections that have developed in the use of said Clarke device.

In practice, it is found that the ball locating gauge of the Clarke device, which is intended to be moved into direct contact with the high point of the ball joint of the foot, not only produces material discomfort when in contact with the ball of the foot, due to the form and location of said ball locating member between the high point of the ball and the upright flange of the inclined side gauge, but also acts to displace the movable gauge itself from its correct gauging position, as will be readily understood by an inspection of Fig. 1 of said patent, the displacement being equal to about one unit of width size measurement.

The present invention is intended to provide a construction and arrangement of ball joint locating and ball length measuring gauge, which may be set to ball locating position without discomfort to the foot and at the same time avoid displacement of the laterally movable width gauge upon which it is mounted. This is accomplished by providing a ball joint locator of substantially wedge shape having its apex or thin edge pointing rearwardly for easy insertion in the V-shaped space between the width gauge and that portion of the foot immediately forward of the ball joint and by compensating for the forwardly offset relationship of the ball joint locator member in relation to the high point of the ball joint by providing a rearward extension to form a pointer which correctly registers the high point of the ball with the appropriate length size indicia of the associated ball length scale. A further feature of this invention resides in the provision by which the ball length gauge may be moved completely out of position for contacting with even the longest foot for which the machine is intended.

These and other features of the invention will be described in the following specification and will be defined in the claims hereto annexed.

In the accompanying drawing I have illustrated a simple and convenient form of construction and arrangement for accomplishing the purposes of this invention, in which Fig. 1 is a plan view of a foot measuring machine of the type referred to illustrating my improved ball length measuring device.

Fig. 2 is a bottom plan view showing the means for slidingly supporting the two opposite gauge elements and their interconnecting members by which, although independently movable, the width gauges may properly caliper the width of the ball porton of the foot and register the same on the width size scale.

Fig. 3 is a perspective view illustrating the construction of my improved ball length gauge and locator.

Fig. 4 is a detail view in cross section on the plane of broken line 4—4 of Fig. 1 illustrating the relation between the ball joint length measuring and locating gauge and its ball length measuring scale.

Fig. 5 is a detail view showing in cross section the ball scale plate or bar turned on its pivotal gudgeons for the purpose of removing the ball length gauge entirely out of the way of the foot when the foot is being inserted between the lateral or width gauges.

Fig. 6 is a side elevation of the construction shown in Fig. 5.

In the practice of the invention as illustrated in the drawing, the base 1, the foot pad 2 raised at the heel, the independently movable width gauges 3 and 7 with their respective upturned contact flanges 3a and 7a diverging at the appropriate angle, are in accordance with the construction disclosed in the aforesaid Patent No. 1,971,954. As explained in that patent, both gauges are slidingly supported by a transverse bar 9 penetrating aligned eyes or bores formed in the underneath extension brackets 3c and 7c of the respective gauge members. On one of the gauge elements 7 is mounted a vertical pivot pin 6, upon which is fulcrumed a movable pointer 8 having a short extension or heel member 8a, which is connected by pivotal link 10 with the supporting bracket 3c of the opposite gauge element 3. The two gauge elements are connected by a retractile spring 11 for the purpose of creating an indrawing tension upon both gauges, while allowing each to adjust itself into proper gauging contact with the opposite sides of the ball portion of the foot.

A transverse toe gauge 20 supported on a slide rod 21, which is carried in appropriate bearing openings in the gauge element 7, serves to register on an over-all length gauge scale plate 22, the over-all length size of the foot being measured as in the aforesaid patent.

The ball joint locating and measuring gauge comprises a body member 12, which carries an undercut and laterally offset ball joint locating member 12ª of substantially wedge shape, which is spaced from the vertical face of the body 12 sufficiently to receive the upturned ball contacting flange 3ª of the side gauge 3. At its rear end this gauge is provided with an offset arm 12ᶜ, which is overhung by an inwardly projecting pointer 12ᵇ. The gauge also has at its forward end a laterally projecting flanged guide member 12ᵈ which rests upon the top face of the scale bar 4. This scale bar is mounted on the width gauge 3 by means of trunnions or gudgeons 5 at each end therof, which are supported in aligned bearings formed in upwardly projecting supporting lugs or members 5ª, so that the scale plate 4 is appropriate not only to carry the ball length scale marks but also to form a guiding track upon which the ball length gauge member 12 slides while permitting the complete removal of the ball gauge member from its position overhanging the upright flange 3ª of the side gauge, so that the foot to be measured may be inserted between the side or width gauges without striking upon the inwardly projecting portion of the ball gauge member. It will therefore be seen that the ball gauge member is mounted both for pivotal movement to and away from operative position and sliding movement along the scale. While I prefer to use a flat top plate of substantial width to permit use of easily read scale numbers, it will be understood that I do not restrict myself to this form of mounting to permit pivotal movement of the ball gauging member to idle position.

The ball locator member 12ª has it inner face inclined to the longitudinal plane of the vertical flange 3ª and is preferably slightly hollowed to correspond with the usual convexity of the ball joint portion of the foot. It will be observed that as the contact flange 3ª of the side gauge moves into contact with the high point of the ball joint of the foot, there is left a V-shaped space between the gauge member 3ª and that portion of the foot in advance of the ball and consequently the inclined and preferably slightly hollowed face of the ball locator 12ª will fit snugly and will be forwardly offset or in advance of the actual high point of the ball joint in contact with the gauge member 3ª. To compensate for this forwardly offset position of the ball locator, the pointer 12ᵇ, that is to register with the scale, is rearwardly offset in position to register with that ball length size mark on the scale that corresponds to the actual ball length size measurement of the foot being measured.

It will be observed that with this arrangement there is no displacement of the gauge 3 from its proper gauging position against the ball joint and, furthermore, there is no discomfort to the ball portion of the foot by crowding the locator member 12ª against the ball of the foot, since the locator is merely pushed into the V-shaped space above-mentioned just enough to form a contacting fit therewith without interfering with the automatic contact of the gauging flange 3ª with the foot that results from the inward pull of the tensioning spring 11.

What I claim is:

1. In a foot measuring device the combination with a foot measuring support provided with laterally movable inclined width gauges and a ball length measuring gauge slidable along one of said width gauges and having an approximately wedge-shaped contact member insertable between the inside wall of the gauge and the forward portion of the convex ball joint of the foot being measured, said gauge being provided with a pointer arranged to travel over a coordinated ball length scale, said ball length gauge being rockable about an axis parallel to the inclined width gauge to permit its being shifted into and out of proper ball gauging position.

2. In a foot measuring machine having a laterally movable inclined ball width gauge, a ball length gauge slidable along said inclined width gauge and adapted to fit into the converging space between the ball portion of the foot and the forwardly extending portion of said width gauge, a ball length size scale plate arranged in parallelism with said inclined width gauge, said ball length gauge being pivotally supported by said scale to permit its being swung into and away from ball gauging position.

3. In a foot measuring machine having a laterally movable inclined ball width gauge, a ball length gauge member slidable along said inclined width gauge and having a rearwardly tapered member adapted to fit into the space between the front portion of the ball joint of an interposed foot and the inside wall of said width gauge, said ball length gauge being mounted on a scale plate in substantial parallelism with the inclined width gauge and having a rearwardly extending pointer coordinated with the ball length scale on said plate to indicate the ball length of the high point of the ball in contact with the width gauge, said gauge being rockable about an axis substantially parallel with the inclined width gauge and slidable along said gauge thereby permitting a longitudinal sliding movement and a lateral pivotal movement in relation to said width gauge.

4. In a foot measuring machine having an inclined laterally movable width gauge, a ball length scale plate pivotally supported to rock about an axis in substantial parallelism with the inclined width gauge, a ball length gauge slidably mounted on said scale plate to permit its being interposed between the inner wall of the width gauge and the forward portion of the ball joint of the foot being measured, said ball length gauge being also provided with a rearwardly extending pointer proportioned to coordinate the proper indicating position on the scale for the high point of said ball joint of the foot.

CHARLES R. ROBERTS.